United States Patent [19]

Tan et al.

[11] Patent Number: 4,912,761

[45] Date of Patent: Mar. 27, 1990

[54] SECURITY FACSIMILE SYSTEMS

[75] Inventors: Jeanette C. Tan, Santa Clarita, Calif.; Jerry R. Iggulden, 21600 Cleardale St., Santa Clarita, Calif. 91321; Donald A. Streck, 832 Country Dr., Ojai, Calif. 93023

[73] Assignees: Jerry R. Iggulden, Santa Clarita; Donald A. Streck, Ojai, both of Calif. ; part interest to each

[21] Appl. No.: 312,700

[22] Filed: Feb. 21, 1989

Related U.S. Application Data

[63] Continuation-in-part of Ser. No. 175,947, Mar. 31, 1988, abandoned.

[51] Int. Cl.$^4$ ...................... H04N 7/167; H04N 1/44; G09C 5/00
[52] U.S. Cl. ...................... 380/18; 355/201; 380/54
[58] Field of Search ...................... 380/14, 18, 54; 355/201

[56]           References Cited

U.S. PATENT DOCUMENTS

| | | |
|---|---|---|
| 2,417,163 | 3/1947 | Horst . |
| 3,279,095 | 10/1966 | Carlson . |
| 4,459,611 | 7/1984 | Arai et al. . |
| 4,586,711 | 5/1986 | Winters . |
| 4,682,954 | 7/1987 | Cook ...................... 380/54 |
| 4,776,013 | 10/1988 | Kafri ...................... 380/54 |
| 4,786,941 | 11/1988 | Regan ...................... 355/201 |

Primary Examiner—Stephen C. Buczinski
Attorney, Agent, or Firm—Donald A. Streck

[57]           ABSTRACT

A security method and apparatus for use in providing an "invisible envelope" for facsimile transmission thereby avoiding the casual reading of documents by persons interposed between the receiver of the transmission and the ultimate designated recipient thereof. Each page of the document is pattern divided into two portions which are individually unreadable in an easy and straightforward manner. The two portions are sent in sequence (i.e. at different times) and then the original document is reconsitituted at the receiving end by the designated recipient employing a transparency overlay process with the two portions. The patterning at the transmitting end may be accomplished by an optical filtering process or may be computer generated as by modifying word processing software or by a separate program manipulating a pre-input document to produce the two portions for printing and transmission. The HideaFAX TM process of this invention is applicable to conventional FAX machines without modification. It can also be built into a conventional FAX machine and can be easily added to the software of PC-fax or Key-FAX TM systems for inclusion therein.

30 Claims, 4 Drawing Sheets

SECURITY FACSIMILE SYSTEMS

BACKGROUND OF THE INVENTION

This is a continuation-in-part application of application Ser. No. 175,947, filed 31 Mar. 1988, now abandoned.

This invention relates to facsimile transmission systems and methods and, more particularly, to a method and associated apparatus for sending a document between a sender and a receiver by facsimile in a manner which prevents unauthorized casual reading of the document wherein the method comprises the steps of:

at the sender:
spatially dividing the document into at least two portions each containing mutually exclusive parts of the document chosen such that each of the portions is independently unrecognizable for casual reading purposes, and
transmitting the portions to the receiver by facsimile transmission one after the other; and,
at the receiver:
receiving the portions, and
overlaying the portions in spatial registration to reconstruct a facsimile of the document in a recognizable and readable form.

In the prior art of facsimile transmission under secure conditions as known to the inventors herein, there is either a keylock (software or physical) required to get the printout of a document on the receiving end or, in the alternative, usual prior art encryption techniques for binary transmissions are applied to the transmitted facsimile data. In this latter case, this typically involves treating the binary bit stream in groups as octal/hexadecimal numbers and adding pseudo-random numbers thereto which must be subtracted off at the receiving end in order to reconstruct the transmitted data and thereby allow printing of the document facsimile. In the above-referenced co-pending application of inventors Iggulden and Streck herein, also entitled Security Facsimile Systems, facsimile protection through pixel manipulation (optical and electronic) is disclosed.

Wherefore, it is the object of this application to provide additional methods and apparatus of facsimile protection through pixel manipulation on a time-shifted basis.

Other objects and benefits of the invention will become apparent from the detailed description which follows hereinafter when taken in conjunction with the drawing figures which accompany it.

SUMMARY

The foregoing object has been achieved the method and associated apparatus of the present invention for creating and sending a document by facsimile in a manner which prevents unauthorized casual reading of the document wherein the method comprises the steps of:

at a sending location:
creating the document;
spatially dividing the document into two portions each containing mutually exclusive parts of the document chosen such that each of the portions is independently unrecognizable for casual reading purposes, and
transmitting the portions by facsimile transmission one after the other to a receiving location; and,
at the receiving location:
receiving the portions, and
overlaying the portions in spatial registration to reconstruct a facsimile of the document in a recognizable and readable form.

The step of spatially dividing the document into two portions may comprise the steps of, accessing a computer memory file containing the document; forming a first portion document containing parts of the document chosen such that the first portion document is independently unrecognizable for casual reading purposes; and, forming a second portion document containing the parts of the document not included in the first portion document.

The step of creating the document may comprise inputting the document to a word processing program which stores the document in the computer memory file in which case the step of transmitting the portions to the receiver by facsimile transmission one after the other may comprise the steps of, storing the first portion document in a computer memory file accessable by the word processing program; storing the second portion document in a computer memory file accessable by the word processing program; using the word processing program to print out the first and second portion documents; and, scanning and transmitting the first and second portion documents with a facsimile transmitting machine.

The step of creating the document may comprise inputting the document to a virtual facsimile computer program which stores the document in the computer memory file in which case the step of transmitting the portions to the receiver by facsimile transmission one after the other may comprise the steps of after the step of forming a first portion document, transmitting the first portion document in a facsimile format; and, after the step of forming a second portion document, transmitting the first portion document in a facsimile format.

The step of creating the document may comprise inputting the document to a KeyFAX device's computer program which stores the document in the computer memory file in which case the step of transmitting the portions to the receiver by facsimile transmission one after the other may comprise during the step of forming a first portion document, transmitting the first portion document in a facsimile format on a line-by-line basis; and, during the step of forming a second portion document, transmitting the second portion document in a facsimile format on a line-by-line basis.

Where the step of creating the document includes printing a hard copy of the document, the step of spatially dividing the document into two portions may comprise the steps of optically filtering the hard copy of the document through a first portion mask defining the areas of the document to be copied into the first portion document; and, optically filtering the hard copy of the document through a second portion mask defining the areas of the document to be copied into the second portion document.

The steps of optically filtering the hard copy of the document through a portion mask defining the areas of the document to be included may each comprise the steps of, placing the hard copy of the document in a document transport having a transparent cover over the hard copy of the document containing the first portion mask as opaque areas thereon; optically scanning the hard copy of the document through the first mask portion to create the first portion document; placing the hard copy of the document in a document transport having a transparent cover over the hard copy of the document containing the second portion mask as opaque areas thereon; and, optically scanning the hard copy of the document through the second mask portion to create the first portion document.

In such case, steps of optically scanning the hard copy of the document through the mask portions to create the document portions may each comprise the step of passing the document transport with the hard copy of the document contained therein through the scanner of a facsimile transmitting machine. Optionally, the scanning step may each comprise placing the document transport with the hard copy of the document contained therein in a photocopy machine to produce first and second photocopies of the first and second portion documents and passing the first and second photocopies through the scanner of a facsimile transmitting machine.

The step of overlaying the portions in spatial registration to reconstruct a facsimile of the document in a recognizable and readable form may comprise the steps of, copying one of the document portions onto a transparent medium; physically placing the transparent medium onto the other portion; and, visually aligning the position of the transparent medium on the other portion to place the document portion on the transparent medium into alignment with the other portion whereby the two portions form a facsimile of the document which can be recognized and read. Preferably, before the step of physically placing the transparent medium onto the other portion there is additionally the step of copying the other portion onto an opaque medium to subject the other portion to any copying induced distortion to which the transparent medium was subjected, wherein the step of physically placing the transparent medium onto the other portion comprises physically placing the transparent medium onto the opaque medium.

The step of overlaying the portions in spatial registration to reconstruct a facsimile of the document in a recognizable and readable form may also comprise the steps of storing one document portion into a computer memory and XORing subsequent document portions with the contents of the computer memory to form a facsimile of the document in the computer memory.

DESCRIPTION OF THE PREFERRED EMBODIMENT

The present invention is based on the proposition of dividing the pixels of each page of a document into two groups according to at least two intermeshed patterns (one being the reverse of the other); transmitting, receiving, and printing the two groups at different times to create two individually unreadable documents; and then recombining the two documents under secure conditions to recreate a facsimile of the original document. As will now be described in detail, this can be accomplished with existing equipment requiring no modification to either the transmitting or receiving facsimile hardware. It can also be built into the transmitting hardware for receipt and reconstruction on the receiving end with standard hardware.

Figure 1:
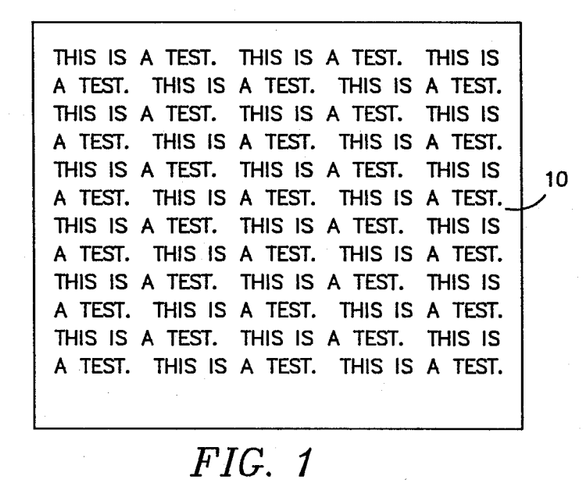
FIG. 1 is a simplified drawing of a test document to be transmitted according to the method of the present invention.

FIG. 1 depicts a document 10 which will be employed in the descriptive example employed hereinafter to demonstrate the method of this invention. Document 10 employs only alpha-numeric information but the invention would work equally with graphic information. Before the description is undertaken further, it should be noted that the intent of this particular facsimile security system is the protection of "business confidential" information, for example, which forms the bulk of facsimile transmissions for which some form of easily implemented security system is required. It is not intended to be employed with military classified documents which require greater security—such as provided by the above-referenced co-pending application of which this is a continuation-in-part.

Normal mail arrives at its destination in an envelope which can be marked "Confidential", or the like, signifying that it is to be opened only by the addressee. Facsimile transmissions, on the other hand, arrive without an envelope. At best, they have a cover sheet that is the first sheet of the transmission. Marking the cover sheet "Confidential" only acts as a flag to the receiver (and any other intermediaries between the receiver and the designated recipient) that the document contains information that might be interesting to read. The only way to avoid undesired reading of the materials is for the sender to call the intended recipient by telephone to advise that a confidential facsimile is about to be transmitted and for the intended recipient to go to the facsimile machine and retrieve the document page by page as it is received and transmitted. In this regard, the present invention provides a kind of invisible envelope for the documents.

Figure 2:
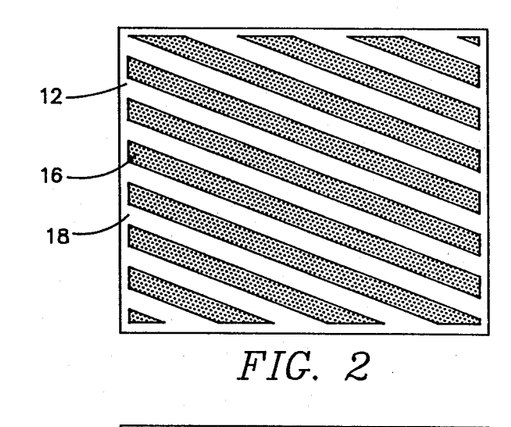
FIG. 2 is a drawing of one "A" pattern that can be employed in the method of the present invention.
Figure 3:
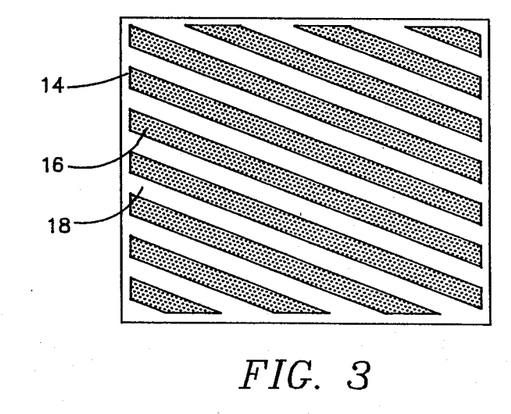
FIG. 3 is a drawing of one "B" pattern that can be employed in the method of the present invention in combination with the "A" pattern of FIG. 2.
Figure 4:
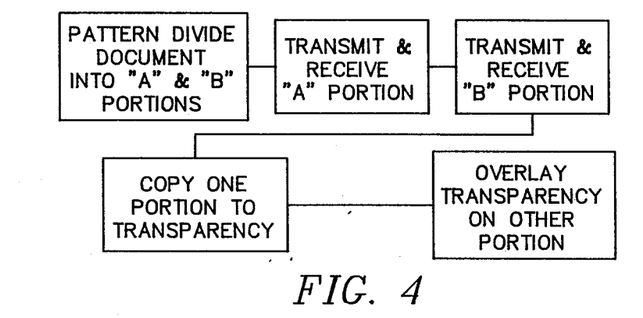
FIG. 4 is a block diagram of the basic steps of the method of the present invention when implemented in its simplest embodiment.

As depicted in FIGS. 2 and 3 and shown in the block diagram of FIG. 4, the method of the invention comprises pattern dividing the document 10 into "A" and "B" portions such as the two patterns 12 and 14 of FIGS. 2 and 3, respectively. As will be noted, the patterns 12, 14 comprise "opaque" portions 16 and "transparent" portions 18 and are the complement of one another; that is, the opaque portions 16 of pattern 12 are the transparent portions 18 of pattern 14, and vice versa. The patterns, of course, can be any shape or design, as desired, as long as they are sized and shaped to divide the pixels of the document into groups that when transmitted and printed out form a total document which is unintelligible to the casual reader. While two complementary patterns 12, 14 (i.e. "A" and "B") are depicted and employed in the example, more than two could be used, if desired, to split the pixel groupings at the different transmission times into smaller and less individually intelligible groups in the documents on the receiving end.

Figures 5, 6:
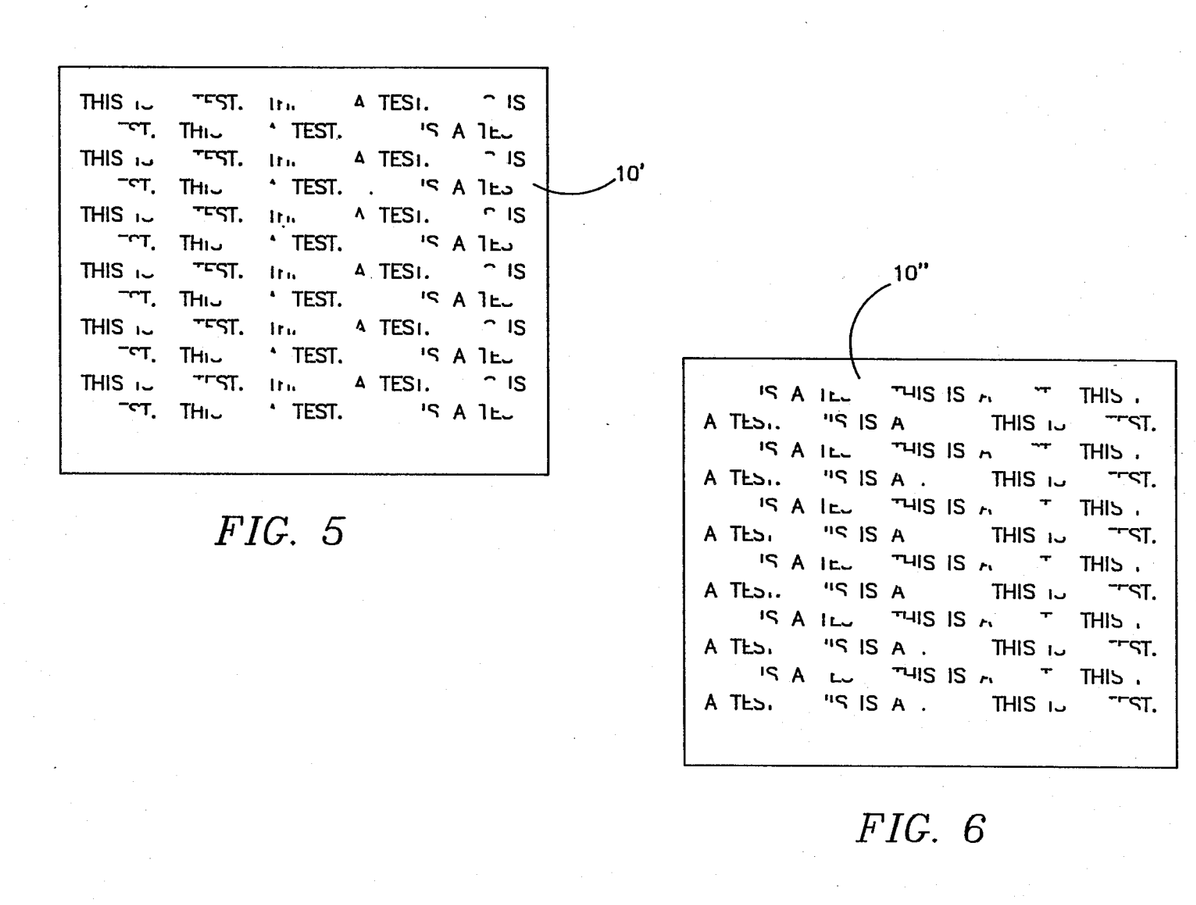
FIG. 5 is a drawing showing the pixel portions of the document of FIG. 1 transmitted at time one after being filtered by the "A" pattern of FIG. 2.
FIG. 6 is a drawing showing the pixel portions of the document of FIG. 1 transmitted at time two after being filtered by the "B" pattern of FIG. 3.
Figure 7:
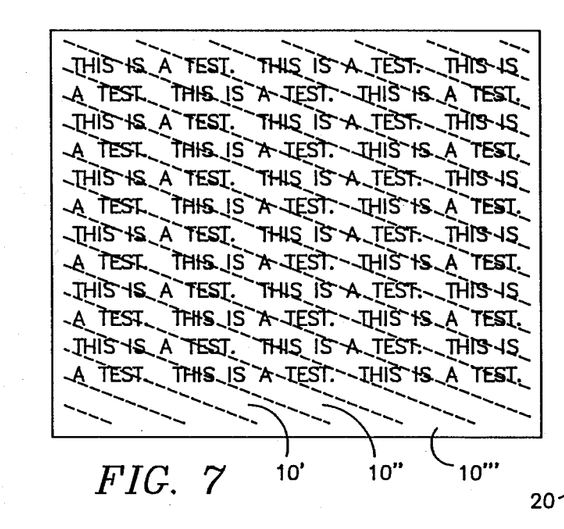
FIG. 7 is a drawing showing how the pixel portions of FIGS. 5 and 6 which are time shifted by transmission at two different times are reconstructed to form a facsimile of the document of FIG. 1.

The "A" pattern group of pixels from the document 10 are then transmitted and received at the destination facsimile machine in the document 10' of FIG. 5. The "B" pattern group of pixels from the document 10 are then transmitted and received at the destination facsimile machine in the document 10" of FIG. 6. The two documents 10', 10" as printed out on the receiving end as representing the time shifted pattern-divided portions of the document 10 are then delivered to the intended recipient. The recipient then reconstructs the document 10 (i.e. opens the "invisible envelope") by copying one of the portions 10', 10" onto a transparency. This can be accomplished easily employing any one of several products presently available commercially for the production of overhead projection transparencies on xerographic process photocopy machines. The transparency of the one portion is then overlayed over the other portion and the areas aligned to allow the entire facsimile 10'" of the document 10 to be viewed by the recipient as indicated in FIG. 7.

Figure 8:
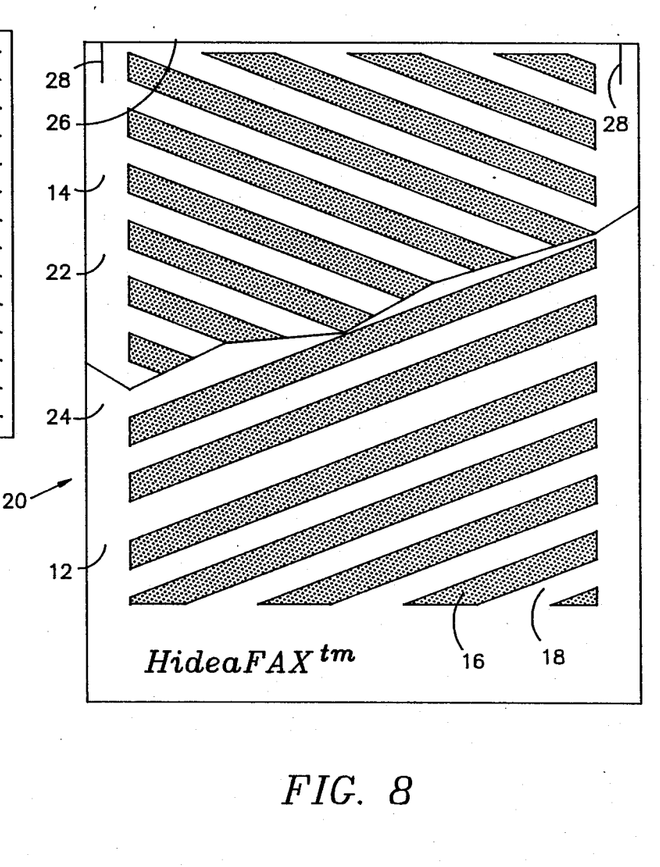
FIG. 8 is a drawing of a document transport envelope according to the present invention an incorporating the "A" and "B" pattern filters of FIGS. 2 and 3 therein.

In its simplest embodiment, the portions 10', 10" of a document 10 can be created by employing a transparent transport envelope 20 of the type generally employed for transporting irregular paper pieces, photographs, and the like, which will not "feed" in the normal manner through a facsimile machine. The envelope 20, of course, must be modified as shown in FIG. 8 to accomplish the objectives of the present invention. The envelope 20 comprises a pair of transparent sheets 22, 24 hingedly joined together at their top edge 26 in the usual manner. To accomplish the objectives of the present invention, one sheet 22 has the "A" pattern 12 printed thereon and the other sheet 24 has the "B" pattern 14 printed thereon. It is preferred that alignment marks 28 be provided for properly aligning a document placed within the envelope 20 with respect to the patterns 12, 14. In use, the document 10 is placed in the envelope 20 with an edge in alignment with the alignment mark 28 and facing upward under the "A" pattern 12. The envelope 20 is then fed through the sending facsimile machine with the sheet 22 (and document 10 inside) being scanned through the "A" pattern. The document 10 is then placed in the envelope 20 with the same edge in alignment with the alignment mark 28 and facing upward under the "B" pattern 12. The envelope 20 is then fed through the sending facsimile machine with the sheet 24 (and document 10 inside) being scanned through the "B" pattern. This, of course, will normally require that the receiving facsimile machine be called twice as the connecting line will be lost while the document 10 is reversed within the envelope 20. For such reason, it may be more desirable to copy the document 10 in the envelope 20 in the two positions as described above on a photocopy machine to create the two portions 10' and 10" on the sending end and then send the copied portions 10', 10" in sequence from the sending facsimile machine without losing the line connection. In testing the method of the present invention in the above-described manner, the inventors herein found that there was a tendency for the document 10 to move and "squirm" within the envelope 20 during feeding through the facsimile machine. Any movement, of course, can cause misalignment problems when reconstructing the document 10 at the receiving end. By photocopying the portions 10', 10" and feeding the photocopies through the facsimile machine, this problem is eliminated. The inventors also found that if the plastic envelope 20 is rubbed so as to create a static charge thereon, the sheets 22 and 24 tend to adhere to one another and hold the document 10 in place much more securely.

Figure 10:
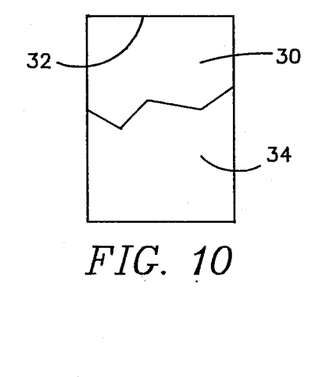
FIG. 10 is a drawing of a composite copy package which can be employed with the present invention to improve registration in the reconstruction process.

With regard to improved performance on the receiving end, the inventors found that the photocopying process typically introduces some distortion into the photocopy with respect to the original which was copied. For that reason, preferred performance will be obtained when practicing the method of this invention if both portions 10' and 10" are photocopied on the same machine—one on paper and one on the transparency film—prior to overlaying them to create the composite facsimile document 10'". It is also anticipated by the inventors herein that improved performance may be achieved if a white sheet of copy paper 30 is releasably attached to the top edge 32 of an associated transparency sheet 32 for use with this invention as depicted in FIG. 10. The two sheets 30, 34 are fed through the photocopy machine together twice—once with the sheet of copy paper active to produce one portion 10', 10" and once with the transparency sheet 34 active to produce the other portion. The two sheets 30, 34 are then separated and overlayed to produce the composite facsimile 10'".

Where the document 10 is produced by a word processing system or the like in a computer, the separation of the document 10 into the two portions 10', 10" for transmission can be accomplished within the word processing software or by a separate program which manipulates the document in memory between its input process and the printing thereof. For example, let us assume that the document as input comprises a document named FOX.DOC as follows:

The quick brown fox jumped over the lazy dog.

After FOX.DOC is produced it can then be pattern manipulated on a line-by-line and character position-by-character position basis to create two new documents FOX1.DOC:

Teucrwoupdvrhayo.

and FOC2.DOC:

hqikbonfxjmeoetelzdg

FOX1.DOC and FOX2.DOC are then printed in the normal manner and transmitted as the two portions 10', 10". As can be appreciated, when one is copied on a transparency and the transparency is overlayed on the other, the original document FOX.DOC will be reconstructed as described above.

Another approach within the scope and spirit of the present invention that could be accomplished in the computer-generated environment is as follows. Assume that the original document FOX.DOC is as above, i.e.:

The quick brown fox jumped over the lazy dog.

Assume then that the two new documents created by manipulating the FOX.DOC document are FOX-1.DOC:

Thehquickibrowndfoxejumpedaoverfthealazyxdog.

and FOX2.DOC:

x x x x x x x x

If FOX2.DOC as transmitted is copied to the transparency and overlayed on the FOX1.DOC document as transmitted, it will appear as:

TheXquickXbrownXfoxXjumpedXoverXtheX-lazyXdog.

which is not readable, although not a true reproduction of the original document. For this reason, this approach is not preferred.

Figure 9:
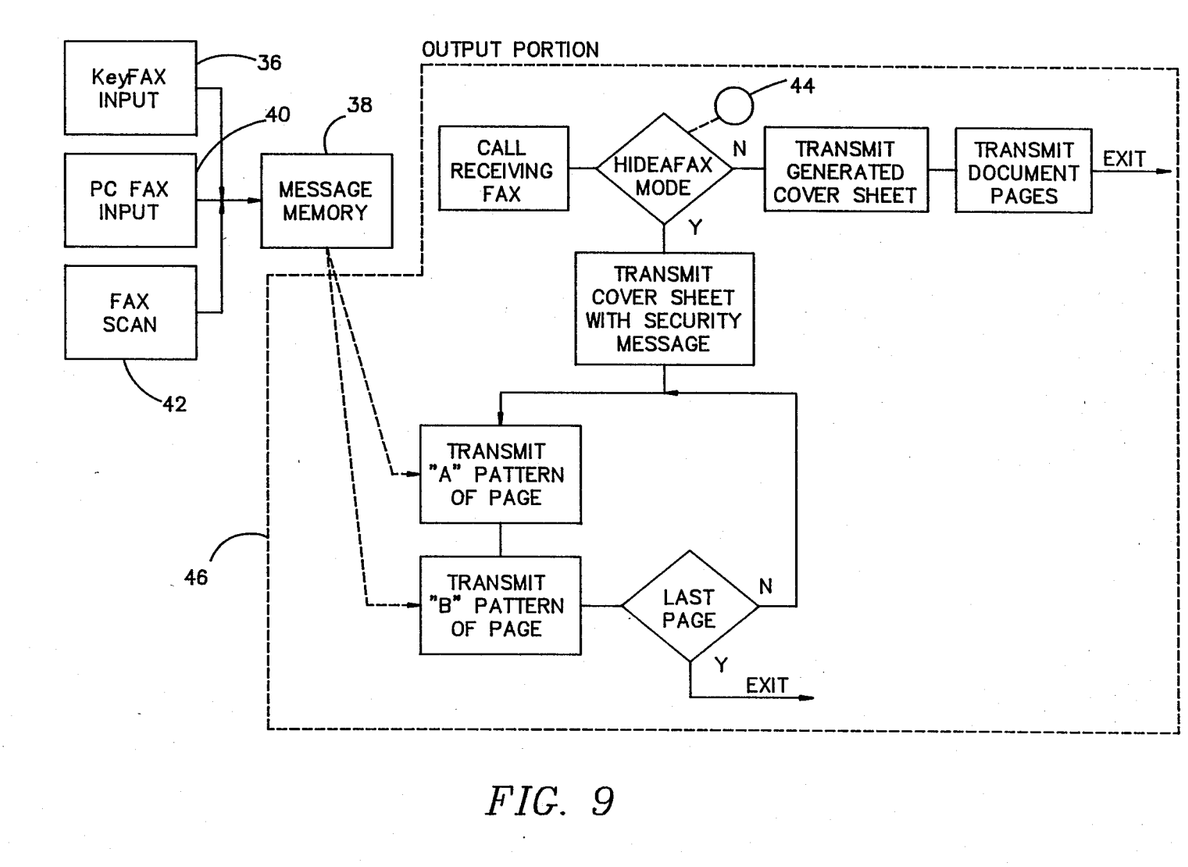
FIG. 9 is a combined functional block diagram and logic flowchart of the apparatus and logic required to implement the present invention in the hardware of various facsimile transmission devices.

The HideaFAX ™ process of the present invention can also be easily incorporated into the software of so-called PC-fax and virtual fax packages that are now available under various trademarks such as, for example, APPLE-FAX. It can also be incorporated into a conventional facsimile transmitting/receiving device or into a KeyFAX ™ device as described in co-pending application Ser. No. 254,925, filed 7 Oct. 1988, entitled KEYBOARD TO FACSIMILE TRANSMISSION SYSTEM by inventors Iggulden and Streck hereof, the teachings of which are incorporated herein by reference. This aspect of the present invention is depicted in FIG. 9. With the KeyFAX device 36, alpha-numeric messages are input through a keyboard (not shown) and stored in a message memory 38 from which they are transmitted as pseudo-pages of facsimile documents. With PC-fax system 40, data and/or graphics are generated and stored in the message memory 38 which comprises page memory which is then transmitted in facsimile format as if scanned into the memory 38 from a facsimile scanner. These two types of devices/systems are already ready for conversion to incorporation of HideaFAX process of the present invention through modification of the programming contained therein. In the case of a conventional facsimile machine, the scan data from the scanning unit 42 typically is transmitted as scanned. To implement the HideaFAX process of the present invention, a message memory 38 must be provided into which the scanned data from the scanning unit 42 is first stored. Since many facsimile machines are now including a memory for receiving facsimile data prior to printing, such memory can be employed for the message memory 38 without the need for adding additional memory. Similarly, in the Keyfax device 36 and PC-fax system 40 the desire to transmit a document as input in the HideaFAX mode can be indicated by means of a keyboard input or the like. With a conventional facsimile machine, a separate button 44 would have to be provided to indicate this desire. In any event, with each of these devices once the message to be transmitted is in the message memory 38 the output portion, as indicated by the dashed box 46, would have to implement logic as shown therein. In particular, after calling the receiving facsimile machine the logic must decide whether or not it is in the HideaFAX mode (as by testing the button 44). If not, it is preferred that a cover sheet be generated and transmitted followed by the document pages in their input form. If the HideaFAX mode has been selected, it is preferred that a cover sheet be generated indicating the recipient as well as advising that the document which follows will comprise two copies of each page being the portions of the page as subjected to the HideaFAX process which will require reconstitution by the designated recipient. The logic then reads a page of the document from the memory 38 and transmits it as filtered with an "A" pattern. As those skilled in the art will readily appreciate, such software filtering according to a designated algorithm is an easily implemented function which can be accomplished without undue experimentation. For example, with alphanumeric documents from a KeyFAX device the above-described process of skipping characters can be employed with very little additional programming required. After the "A" pattern portion of the page of the document has been sent, the process is then repeated for the "B" pattern portion of the same page. As shown in the logic of FIG. 9, the same process is repeated for each page of the document until the last page has been transmitted.

Note that, in all cases where the patterning of the document is affected by software manipulation of the document as input, it is preferred that the software recognize control characters within the text of the document, employ them for turning the HideaFAX mode on and off within portions of the document itself, and remove the control characters from the document as transmitted. For example, the sequence " B" could indicate "Begin HideaFAX processing." while the sequence " E" could indicate "End HideaFAX processing."

As a final note, those skilled in the art will readily appreciate that, if desired for the particular implementation, the reconstruction of the document 10 from the portions 10', 10" could be accomplished by a computer at the receiving end. The first transmitted portion 10' could be received and stored in a page memory. The second transmitted portion 10" could then be overlayed by employing a software "transparency" thereof in the form of an XOR merging of the two portions. Such a computer implementation of the document reconstitution process at the receiving end is considered to be within the scope and spirit of the present invention and the term "transparency" as employed in the description above and in interpreting that term as it may appear in the claims appended hereinafter.

Wherefore, having thus described our invention, what is claimed is:

1. The method of creating and sending a document by facsimile in a manner which prevents unauthorized casual reading of the document at a receiving location comprising the steps of:
    (a) at a sending location;
        (a1) creating the document;
        (a2) spatially dividing the document into two portions each containing mutually exclusive parts of the document chosen such that each of the portions is independently unrecognizable for casual reading purposes by
            accessing a computer memory file containing the document,
            forming a first portion document containing parts of the document chosen such that the first portion document is independently unrecognizable for casual reading purposes, and
forming a second portion document containing the parts of the document not included in the first portion document, and
(a3) transmitting the portions by facsimile transmission one after the other to the receiving location; and,
(b) at the receiving location;
(b2) receiving the portions, and
(b2) overlaying the portions in spatial registration to reconstruct a facsimile of the document in a recognizable and readable form.

2. The method of claim 1 wherein said step of spatially dividing the document into two portions comprises the steps of:
(a) accessing a computer memory file containing the document;
(b) forming a first portion document containing parts of the document chosen such that the first portion document is independently unrecognizable for casual reading purposes; and,
(c) forming a second portion document containing the parts of the document not included in the first portion document.

3. The method of claim 1 wherein said step of creating the document comprises inputting the document to a word processing program which stores the document in the computer memory file and said step of transmitting the portions to the receiver by facsimile transmission one after the other comprises the steps of:
(a) storing the first portion document in a computer memory file accessable by the word processing program;
(b) storing the second portion document in a computer memory file accessable by the word processing program;
(c) using the word processing program to print out the first and second portion documents; and,
(d) scanning and transmitting the first and second portion documents with a facsimile transmitting machine.

4. The method of claim 1 wherein said step of creating the document comprises inputting the document to a virtual facsimile computer program which stores the document in the computer memory file and said step of transmitting the portions to the receiver by facsimile transmission one after the other comprises the steps of:
(a) after said step of forming a first portion document, transmitting the first portion document in a facsimile format; and,
(b) after said step of forming a second portion document, transmitting the first portion document in a facsimile format.

5. The method of claim 1 wherein said step of creating the document comprises inputting the document to a KeyFAX device's computer program which stores the document in the computer memory file and said step of transmitting the portions to the receiver by facsimile transmission one after the other comprises:
(a) during said step of forming a first portion document, transmitting the first portion document in a facsimile format on a line-by-line basis; and,
(b) during said step of forming a second portion document, transmitting the second portion document in a facsimile format on a line-by-line basis.

6. The method of claim 1 wherein said step of overlaying the portions in spatial registration to reconstruct a facsimile of the document in a recognizable and readable form comprises the steps of:
(a) copying one of the document portions onto a transparent medium;
(b) copying the other portion onto an opague medium to subject the other portion to any copying induced distortion to which the transparent medium was subjected;
(c) physically placing the transparent medium onto the other portion; and,
(d) visually aligning the position of the transparent medium onto the opaque medium to place the document portion on the transparent medium into alignment with the other portion whereby the two portions form a facsimile of the document which can be recognized and read.

7. The method of claim 1 wherein said step of overlaying the portions in spatial registration to reconstruct a facsimile of the document in a recognizable and readable form comprises the steps of:
(a) storing one document portion into a computer memory; and,
(b) XORing subsequent document portions with the contents of the computer memory to form a facsimile of the document in the computer memory.

8. The method of creating and sending a document by facsimile in a manner which prevents unauthorized casual reading of the document at a receiving location comprising the steps of:
(a) at a sending location;
(a1) creating a hard copy of the document;
(a2) spatially dividing the document into two portions each containing mutually exclusive parts of the document chosen such that each of the portions is independently unrecognizable for casual reading purposes by,
optically filtering the hard copy of the document through a first portion mask defining the areas of the document being copied into the first portion document and
optically filtering the hard copy of the document through a second portion mask defining the areas of the document being copied into the second portion document, and
(a3) transmitting the portions by facsimile transmission one after the other to the receiving location; and,
(b) at the receiving location;
(b2) receiving the portions, and
(b2) overlaying the portions in spatial registration to reconstruct a facsimile of the document in a recognizable and readable form.

9. The method 8 wherein said steps of optically filtering the hard copy of the document through a portion mask defining the areas of the document to be included each comprises the steps of:
(a) placing the hard copy of the document in a document transport having a transparent cover over the hard copy of the document containing the first portion mask as opaque areas thereon;
(b) optically scanning the hard copy of the document through the first mask portion to create the first portion document;
(c) placing the hard copy of the document in a document transport having a transparent cover over the hard copy of the document containing the second portion mask as opaque areas thereon; and, (d) optically scanning the hard copy of the document through the second mask portion to create the first portion document.

10. The method of claim 9 wherein said steps of optically scanning the hard copy of the document through the mask portions to create the document portions each comprises the step of:
   passing the document transport with the hard copy of the document contained therein through the scanner of a facsimile transmitting machine.

11. The method of claim 9 wherein said steps of optically scanning the hard copy of the document through the mask portions to create the document portions each comprises the steps of:
   (a) placing the document transport with the hard copy of the document contained therein in a photocopy machine to produce first and second photocopies of the first and second portion documents; and,
   (b) passing the first and second photocopies through the scanner of a facsimile transmitting machine.

12. The method of claim 8 wherein said step of overlaying the portions in spatial registration to reconstruct a facsimile of the document in a recognizable and readable form comprises the steps of:
   (a) copying one of the document portions onto a transparent medium;
   (b) copying the other portion onto an opaque medium to subject the other portion to any copying induced distortion to which the transparent medium was subjected;
   (c) physically placing the transparent medium onto the other portion; and,
   (d) visually aligning the position of the transparent medium onto the opaque medium to place the document portion on the transparent medium into alignment with the other portion whereby the two portions form a facsimile of the document which can be recognized and read.

13. The method of creating and sending a document by facsimile in a manner which prevents unauthorized casual reading of the document at a receiving location comprising the steps of:
   (a) at a sending location;
      (a1) creating a hard copy of the document;
      (a2) spatially dividing the document into two portions each containing mutually exclusive parts of the document chosen such that each of the portions is independently unrecognizable for casual reading purposes by,
         placing the hard copy of the document in a document transport having a transparent cover over the hard copy of the document containing a first portion mask defining the areas of the document to be copied into the first portion document as opaque areas thereon,
         optically scanning the hard copy of the document through the first mask portion to create the first portion document,
         placing the hard copy of the document in a document transport having a transparent cover over the hard copy of the document containing a second portion mask defining the areas of the document to be copied into the second portion document as opaque areas thereon, and
         optically scanning the hard copy of the document through the second mask portion to create the first portion document; and,
      (a3) transmitting the portions by facsimile transmission one after the other to the receiving location; and,
   (b) at the receiving location;
      (b1) receiving the portions, and
      (b2) overlaying the portions in spatial registration to reconstruct a facsimile of the document in a recognizable and readable form by,
         copying one of the document portions onto a transparent medium,
         physically placing the transparent medium onto the other portion, and
         visually aligning the position of the transparent medium on the other portion to place the document portion on the transparent medium into alignment with the other portion whereby the two portions form a facsimile of the document which can be recognized and read.

14. The method of claim 13 wherein said steps of optically scanning the hard copy of the document through the mask portions to create the document portions each comprises the step of:
   passing the document transport with the hard copy of the document contained therein through the scanner of a facsimile transmitting machine.

15. The method of claim 14 wherein said steps of optically scanning the hard copy of the document through the mask portions to create the document portions each comprises the steps of:
   (a) placing the document transport with the hard copy of the document contained therein in a photocopy machine to produce first and second photocopies of the first and second portion documents; and,
   (b) passing the first and second photocopies through the scanner of a facsimile transmitting machine.

16. The method of claim 13 and before said step of physically placing the transparent medium onto the other portion additionally comprising the step of:
   (a) copying the other portion onto an opaque medium to subject the other portion to any copying induced distortion to which the transparent medium was subjected; and wherein,
   (b) said step of physically placing the transparent medium onto the other portion comprises physically placing the transparent medium onto the opaque medium.

17. The method of creating and sending a document by facsimile in a manner which prevents unauthorized casual reading of the document at a receiving location comprising the steps of:
   (a) at a sending location;
      (a1) creating the document with a word processing computer program as a file in computer memory;
      (a2) spatially dividing the document into two portions each containing mutually exclusive parts of the document chosen such that each of the portions is independently unrecognizable for casual reading purposes by,
         accessing a computer memory file containing the document,
         forming a first portion documetn containing parts of the document chosen such that the first portion document is independently unrecognizable for casual reading purposes, and forming a second portion document containing the parts of the document not included in the first portion document;
(a3) transmitting the first and second portion documents by facsimile transmission one after the other to the receiving location; and,
(b) at the receiving location;
(b1) receiving the portions, and
(b2) overlaying the portions in spatial registration to reconstruct a facsimile of the document in a recognizable and readable form by,
copying one of the document portions onto a transparent medium,
physically placing the transparent medium onto the other portion, and
visually aligning the position of the transparent medium on the other portion to place the document portion on the transparent medium into alignment with the other portion whereby the two portions form a facsimile of the document which can be recognized and read.

18. The method of claim 17 and before said step of physically placing the transparent medium onto the other portion additionally comprising the step of:
(a) copying the other portion onto an opaque medium to subject the other portion to any copying induced distortion to which the transparent medium was subjected; and wherein,
(b) said step of physically placing the transparent medium onto the other portion comprises physically placing the transparent medium onto the opaque medium.

19. A system for sending a document by facsimile in a manner which prevents unauthorized casual reading of the document at a receiving site comprising:
(a) at a sending site;
(a1) means for spatially dividing the document into at least two portions each containing mutually exclusive parts of the document chosen such that each of the portions is independently unrecognizable for casual reading purposes comprising
a computer memory file containing the document,
means for accessing the file and for forming a first portion document containing parts of the document chosen such that the first portion document is independently unrecognizable for casual reading purposes, and
means for accessing the file and for forming a second portion document containing the parts of the document not included in the first portion document, and
(a2) facsimile transmitter means for transmitting the portions to the receiving site by facsimile one after the other; and,
(b) at the receiving site;
(b2) facsimile receiving means for receiving the portions, and
(b2) means for overlaying the portions in spatial registration to reconstruct a facsimile of the document in a recognizable and readable form.

20. The system of claim 19 wherein said means for spatially dividing the document into at least two portions comprises:
(a) a computer memory file containing the document;
(b) means for accessing the file and for forming a first portion document containing parts of the document chosen such that the first portion document is independently unrecognizable for casual reading purposes; and,
(c) means for accessing the file and for forming a second portion document containing the parts of the document not included in the first portion document.

21. The system of claim 19 wherein the computer memory file containing the document was created by a word processing program and said facsimile transmitter means comprises:
(a) a first computer memory file for storing the first portion document accessable by the word processing program;
(b) a second computer memory file for storing the second portion document accessable by the word processing program;
(c) means for using the word processing program to access the first and second computer memory files and to print out the first and second portion documents; and,
(d) facsimile transmitting means for scanning and transmitting the first and second portion documents in a facsimile format.

22. The system of claim 19 wherein the computer memory file containing the document was created by a virtual facsimile computer program and said facsimile transmitter means comprises:
(a) means disposed after said means for forming a first portion document and before said means for forming a second portion document for transmitting the first portion document in a facsimile format; and,
(b) means disposed after said means for forming a second portion document for transmitting the second portion document in a facsimile format.

23. The system of claim 19 wherein the computer memory file containing the document was created by a KeyFAX device's computer program and said facsimile transmitting means comprises:
(a) means associated with said means for forming a first portion document for transmitting the first portion document in a facsimile format on a line-by-line basis; and,
(b) means associated with said means for forming a second portion document for transmitting the second portion document in a facsimile format on a line-by-line basis.

24. The system of claim 19 wherein said means for spatially dividing the document into at least two portions comprises:
(a) means for optically filtering the document through a first portion mask defining the areas of the document to be copied into the first portion document; and,
(b) means for optically filtering the document through a second portion mask defining the areas of the document to be copied into the second portion document.

25. The system of claim 24 wherein said means for optically filtering the document through a portion mask defining the areas of the document to be included each comprises:
(a) a first document transport for holding the document and having a transparent cover over the document containing the first portion mask as opaque areas thereon;
(b) means for optically scanning the document through the first mask portion to create the first portion document;

(c) a second document transport for holding the document and having a transparent cover over the document containing the second portion mask as opaque areas thereon; and, (d) means for optically scanning the document through the second mask portion to create the first portion document.

26. The system of claim 25 wherein:
said first and second document transports comprise a single document transport having first and second transparent covers hingedly joined at a top edge wherein said first cover contains the first portion mask as opaque areas thereon and said second cover contains the second portion mask as opaque areas thereon.

27. The system of claim 19 wherein said means for overlaying the portions in spatial registration to reconstruct a facsimile of the document in a recognizable and readable form comprises:

(a) a transparent medium; and, (b) means for copying one of the document portions onto said transparent medium whereby by physically placing said transparent medium containing said one document portion copied thereon onto the other portion and visually aligning the position of said transparent medium on the other portion to place the document portion on said transparent medium into alignment with the other portion the two portions can be made form a facsimile of the document which can be recognized and read.

28. In a system for sending a document by facsimile, the improvement for sending documents in a manner which prevents unauthorized casual reading of the document at a receiving site comprising:

(a) at a sending site, means for spatially dividing and transmitting the document as two portions each containing mutually exclusive parts of the document chosen such that each of the portions is independently unrecognizable for casual reading purposes comprising, (a1) means for optically filtering the document through a first portion mask defining the areas of the document to be copied into the first portion document, and (a2) means for optically filtering the document through a second portion mask defining the areas of the document to be copied into the second portion document; and, (b) at the receiving site, means for overlaying the received portions in spatial registration to reconstruct a facsimile of the document in a recognizable and readable form.

29. The improvement of claim 28 wherein said means for optically filtering the document through a portion mask defining the areas of the document to be included each comprises:

(a) a first document transport for holding the document as it is optically scanned having a transparent cover over the document containing the first portion mask as opaque areas thereon; and, (b) a second document transport for holding the document as it is optically scanned having a transparent cover over the document containing the second portion mask as opaque areas thereon.

30. The improvement of claim 29 wherein:
said first and second document transports comprise a single document transport having first and second transparent covers hingedly joined at a top edge wherein said first cover contains the first portion mask as opaque areas thereon and said second cover contains the second portion mask as opaque areas thereon.

* * * * *